US008750786B2

(12) United States Patent
Larsson et al.

(10) Patent No.: US 8,750,786 B2
(45) Date of Patent: Jun. 10, 2014

(54) FORWARDING NODE IN A WIRELESS COMMUNICATION SYSTEM

(75) Inventors: Peter Larsson, Solna (SE); Niklas Johansson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 657 days.

(21) Appl. No.: 12/808,511

(22) PCT Filed: Dec. 21, 2007

(86) PCT No.: PCT/SE2007/051079
§ 371 (c)(1),
(2), (4) Date: Jun. 16, 2010

(87) PCT Pub. No.: WO2009/082311
PCT Pub. Date: Jul. 2, 2009

(65) Prior Publication Data
US 2010/0279602 A1 Nov. 4, 2010

(51) Int. Cl.
*H04B 3/36* (2006.01)
*H04B 7/14* (2006.01)
(52) U.S. Cl.
USPC .......... 455/7; 455/11.1; 455/15; 455/20; 455/41.2; 455/3.05; 370/279; 370/293; 370/315; 370/492; 375/211

(58) Field of Classification Search
USPC ......... 455/7, 9, 11.1, 13.1, 15, 16, 20, 22, 24, 455/41.2, 408, 450, 455, 3.05; 370/274, 370/278, 279, 293, 315, 492, 501; 375/211, 375/214
See application file for complete search history.

(56) References Cited

U.S. PATENT DOCUMENTS

| 5,095,528 | A | 3/1992 | Leslie et al. | |
|---|---|---|---|---|
| 2004/0137854 | A1* | 7/2004 | Ge | 455/78 |
| 2004/0146013 | A1* | 7/2004 | Song et al. | 370/279 |
| 2006/0052066 | A1* | 3/2006 | Cleveland et al. | 455/101 |

FOREIGN PATENT DOCUMENTS

| EP | 0302455 A2 | 2/1989 |
|---|---|---|
| WO | 97/08854 | 3/1997 |
| WO | 2007/073092 A1 | 6/2007 |

* cited by examiner

*Primary Examiner* — Shaima Q Aminzay
(74) *Attorney, Agent, or Firm* — Coats and BEnnett, P.L.L.C.

(57) ABSTRACT

The invention relates to a relay or repeater node (21) for use in a wireless communications system said node comprising a receive antenna (23) for receiving a signal through a wireless connection, an amplifier (30) for amplifying the signal and a transmit antenna (27) for forwarding the amplified signal, said node further comprising a mode switching unit (31) for switching between at least a first and a second mode of operation of the node in dependence of an amplification gain requirement. This enables optimization of the node for varying conditions in the network.

19 Claims, 4 Drawing Sheets

FORWARDING NODE IN A WIRELESS COMMUNICATION SYSTEM

TECHNICAL FIELD

The present invention relates to a relay or repeater node for use in a cellular communications system and a method of operating such a node.

BACKGROUND AND RELATED ART

As more and more communication is performed in wireless/cellular communication systems, the requirements on such systems are constantly increasing. Such requirements relate both to increased coverage and support of higher data rates, or preferably a combination of both.

To enhance coverage and data rate a forwarding node, such as a repeater or a relay, is often used. Such forwarding nodes typically receive the signal and amplify it before transmitting it to the receiver. The benefit of using repeaters and relays stems primarily from that splitting a long distance in two hops allows increased data rate on each link as well as End-To-End total data rate.

The distinction between the repeaters and relays is not entirely clear cut. Often, the term repeater is used to denote a simple, low processing node that receives a signal, amplifies it and sends it out. However, some repeaters also demodulate and remodulate the received signal, and even include power control. A relay is normally considered a bit more advanced and complex. It typically receives a signals demodulated and (FEC)-decode it prior deciding which resource to send it onto, e.g. through scheduling. To complicate things a bit, relaying is often used as an umbrella term, including any node forwarding any piece of information.

There are many different types of repeaters, such as frequency translating and on-frequency repeaters. The so called on-frequency repeater transmits the signal on the same resource as it was received on. That is, it uses the same frequency and/or coding scheme and transmits the signal immediately upon receiving it. Such a repeater avoids the resulting throughput loss, often referred to as a duplex loss, that arises in many schemes where the node forwarding data or signal can not receive and transmit at the same time and on the same frequency.

On the other hand, an on-frequency repeater is prone to self-interference since the same signal is received and transmitted at virtually the same time. Therefore, the gain that can be applied in such a repeater is limited to a level that will not cause excessive self-interference. To minimize self-interference, a high degree of isolation between the input antenna and the output antenna is usually aimed for. Further techniques for self-interference cancellation are often applied. The latter means that the repeater internally cancels the repeater output signal that is fed back to the repeater. Even with such measures to reduce self-interference, the maximum gain is limited.

The on-frequency repeater is an attractive solution to come to terms with the duplex loss seen for relays and frequency translating repeaters, but is often inadequate when the repeater receives a weak signal and needs to amplify the signal and communicate to a distant receiver to which the path loss is high.

On the other hand, repeaters that receive and transmit on different resources, such as frequency translating repeaters avoid self-interference at the cost of introducing a duplex loss.

Hence, when designing networks a trade-off is made between the need for high amplification gain and optimum throughput.

A network architecture using relay nodes is disclosed in Patent Application Publication No. US2007/0160014 A1. Patent Application Publication No. U.S. 2005/0232223 discusses the use of on-frequency or frequency-shifting repeaters.

SUMMARY OF THE INVENTION

It is an object of the invention to provide a relay and/or repeater node with improved performance under varying conditions.

This object is achieved according to the present invention by a node for use in a wireless communications system said node comprising a receive antenna side having at least one receive antenna for receiving a signal through a wireless connection, an amplifier for amplifying the signal and a transmit antenna side having at least one transmit antenna for forwarding the amplified signal, said node further comprising a mode switching unit for switching between at least a first and a second mode of operation of the node in dependence of an amplification gain requirement.

The object is also achieved by a method of repeating a signal in a cellular network, comprising the steps of
  receiving the signal in a node comprising a receive antenna side having at lest one receive antenna, a transmit antenna side having at least one transmit antenna, and an amplifier between said receive antenna and said transmit antenna,
  amplifying the signal and
  transmitting the amplified signal, characterized by the step of
  selecting one of a first mode and a second mode of operation for the node in dependence of an amplification gain requirement.

By enabling adaptive switching between on-frequency operation and receive and transmitting on orthogonal resources for the relay/repeater node the invention ensures that the repeater function can be performed without duplex loss whenever possible, that is, when an on-frequency repeating is feasible. At the same time, higher gain can be achieved when this is desirable, to enable supporting repeater node to receiver node links with a higher path loss, or Signal to Interference Ratio (SIR). In addition, switching to the frequency translating mode can enable improving the reception performance of the relay/repeater node through the enhanced signal to interference ratio as self-interference can not be cancelled perfectly in the on-frequency mode.

Hence, a main benefit of this adaptive hybrid operation between on-frequency repeater operation and either of frequency translating repeater or a relay is that the spectral efficiency offered by on-frequency repeater can be used, whereas still operating in situations where high gain operation is occasionally required.

Another benefit is that when the relay/repeater node may experience a low SNR at receiving, the switching from the normal spectral efficient on-frequency operation to the mode where reception and transmission from the relay occur on orthogonal resources enables increased receiver sensitivity for the repeater as the feedback signal occur on another non-interfering resource.

In a preferred embodiment, the mode switching unit is arranged to switch between a first mode wherein the transmit antenna side utilizes the same resource as the receive antenna side and a second mode wherein the transmit antenna side utilizes a different resource from the receive antenna side. The use of different resources will reduce the self-interference from the transmitting side to the receiving side. Preferably, in the second mode, the transmit antenna side utilizes a resource that is substantially orthogonal to the resource used by the receive antenna side, as this will minimize the self-interference.

In another preferred embodiment, the mode switching unit is arranged to switch between a first mode wherein the transmit antenna side utilizes a different resource from the receive antenna side and a second mode wherein the transmit antenna side utilizes a different resource from the receive antenna side, said first and second mode enabling different ways of changing the resource. This will enable a switch between, for example, a first mode in which translation is made between a first and a second frequency and a second mode in which translation is made between a first and a second code.

Preferably, at least a first threshold is defined and the mode switching unit is arranged to switch to the first mode when the required amplification gain is below the first threshold. The mode switching unit may be further arranged to switch to the second mode when the required amplification gain is above the first threshold.

As an added feature, the mode switching unit may be arranged to switch to a third mode when the required amplification gain is above a second threshold which is higher than the first threshold. This will enable a predefined structure of different translation modes, depending on which mode provides the best protection against self-interference.

In a preferred embodiment the node comprises a mode selector unit for selecting a mode and for feeding information about the selected mode to the mode switching unit. Alternatively, the step of selecting the mode may be performed in a sending node and/or a receiving node and information about which mode to select may be communicated from the sending and/or receiving node to the repeater node. In the latter case, the mode switching unit may be arranged to receive from a sending node and/or a receiving node a message about which mode to select. The information about which mode to select may be in the used directly as input to the mode selector unit, or may be used as a recommendation by the node when selecting the mode.

The invention also relates to a wireless communications system comprising at least one base station arranged to communicate with at least one mobile terminal and at least one repeater node or relay node comprising a receive antenna for receiving a signal through a wireless connection, an amplifier for amplifying the signal and a transmit antenna for forwarding the amplified signal, characterized in that said repeater node or relay node is a node as described above.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
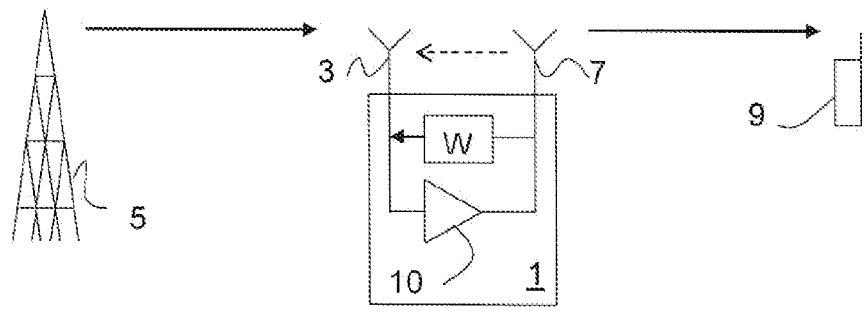
FIG. 1 illustrates an on-frequency repeater function

FIG. 1 illustrates an on-frequency repeater function, that is, the repeater receives and transmits on the same resource at substantially the same time, hence causing self interference from the output to the input, although in practice there will always be a small delay. The repeater 1 comprises a receive antenna 3 arranged to receive a signal from a base station 5 and a transmit antenna 7 arranged to forward the signal to a mobile terminal 9. An amplifier 10 provides a gain between the receive antenna 3 and the transmit antenna 7. The signal is forwarded on the same resource on which it was received. This means that the repeater 1 uses the same frequency, non-orthogonal coding etc. and forwards the signal immediately upon receiving it.

Such repeaters are prone to self-interference, and are therefore typically designed so that the transmit and receive antennas are isolated from each other to the extent possible. As discussed above self-interference cancellation methods based on feedback signals between the transmit antenna and the receive antenna are used to reduce self-interference. In FIG. 1 this feedback signal is illustrated by a unit W indicating that it applies a (complex valued) weighting of the feedback signal. Still, if the signal power feed back to the input becomes too high, self-interference cannot be completely ruled out in such repeaters. Self-interference is illustrated in FIG. 1 by a dashed line from the transmit antenna to the receive antenna.

Figure 2:
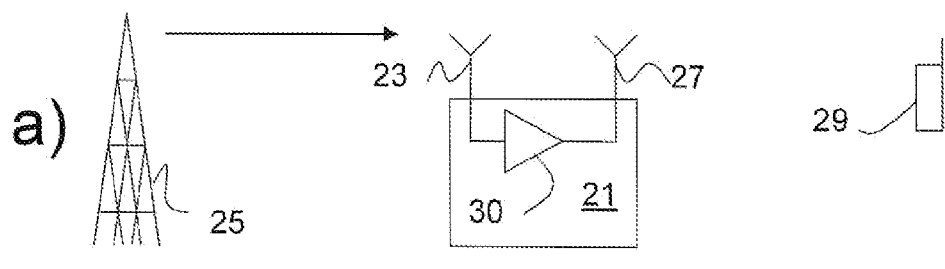
FIG. 2 illustrates a repeater function utilizing different resources for receiving and transmitting
Figure 2:
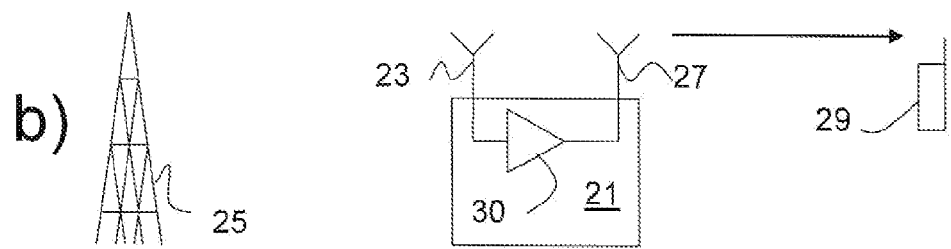

FIG. 2 illustrates a repeater 21 arranged to forward the received signal on a different resource from the one on which it was received. Preferably, the resources are substantially orthogonal, to minimize the interference between them. For example, the repeater 21 may be a frequency translating repeater. Again the repeater 21 comprises a receive antenna 23 arranged to receive a signal from a base station 25 and a transmit antenna 27 arranged to forward the signal to a mobile terminal 29. To illustrate the use of different resources, the receiving function and the transmission function are shown in two different parts of the figure, a) and b), respectively.

Figure 3A:
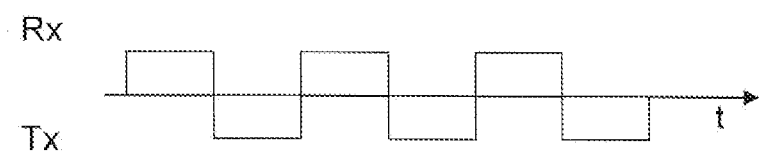
FIGS. 3a-3c illustrates methods of using different resources.
Figure 3B:
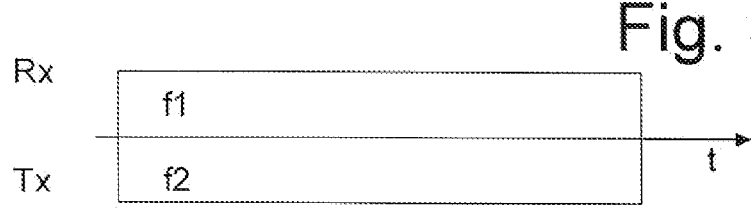
Figure 3C:
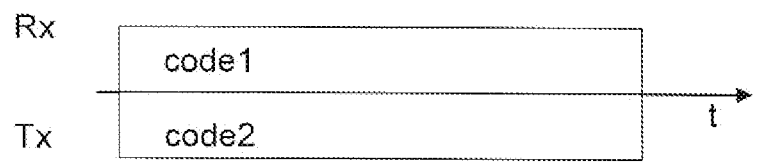

FIGS. 3a-3c illustrate different ways to utilize different resources. In each of these figures the horizontal axis represents time t. In FIG. 3a, the receive function Rx and the transmit function Tx are assigned different time intervals, so that the repeater 11 never transmits and receives at the same time. In FIG. 3b the receive function Rx and the transmit function Tx are assigned different frequency domains, f1 and f2, respectively. In FIG. 3c the receive function Rx and the transmit function Tx are assigned different orthogonal spreading codes, code1 and code2, respectively.

Figure 4:
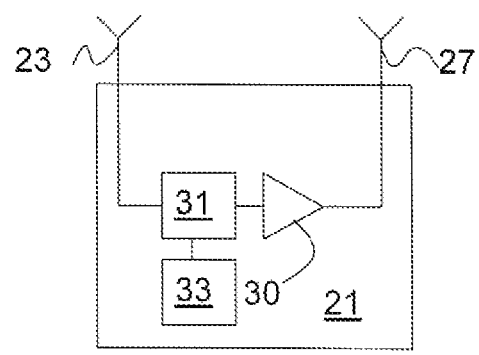
FIG. 4 illustrates a relay or repeater node according to the invention

FIG. 4 illustrates a repeater 21 according to an embodiment of the invention, which is able to switch between a first and a second mode of operation depending on the conditions. As before, the repeater 21 comprises a receive antenna side having at least one receive antenna 23 arranged to receive a signal from a base station 25 and a transmit antenna side having at least one transmit antenna 27 arranged to forward the signal to a mobile terminal 29. An amplifier 30 provides a gain between the receive antenna 23 and the transmit antenna 27. The repeater 21 also comprises a mode switch 31 arranged between the receive antenna 23 and the transmit antenna 27 in series with the amplifier 30. The mode switch is arranged to switch between a first and a second mode of operation of the repeater 21. Which mode to switch to may be determined by a mode selector 33 arranged in the repeater 21. Alternatively, it may be determined in the sender or the receiving node, or possibly in a distributed fashion over those nodes. In the latter case, information about the selected mode can be received in the repeater node 21 by means of the receive antenna 23 and processed in the mode switch 31. The repeater 21 may also comprise other units, for example, a feedback unit, as shown in FIG. 1 for interference cancellation.

In the first mode the relay or repeater will transmit concurrently while receiving on the same frequency. This is suitable in situations where the SIR is good, which will often be the case, for example, when the path loss is low. In the second mode, the relay/repeater node will use different resources for receiving and transmitting. The resources are preferably orthogonal, to minimize interference between them. As discussed in connection with FIGS. 3a-3c, the resources may be divided in time, in frequency and/or in the code domain.

One advantage of the time duplex operation shown in FIG. 3a is that the relay/repeater node can decode the received signal and retrieve the payload information without noise. The noise free version can then be amplified and transmitted instead of amplifying a signal comprising both the payload and the noise.

In a preferred embodiment, the condition for selecting the first or the second mode is whether the required relay/repeater node gain is above or below a gain threshold value $G_0$. The gain threshold value will inherently be determined by the relay/repeater node design, i.e. the isolation between the transmit and receive antennas, whether any interference cancellation is applied, etc. First, the gain needed in the relay/repeater node can be determined as $$G_{RN} = P_{RN}^{(TX)}/P_{RN}^{(RX)} = P_{MN}^{(RX)} G_{RN \to MN}/P_{RN}^{(RX)}. \quad (1)$$

where
TX and RX stand for transmit and receive respectively,
RN denotes for relay/repeater node,
MN denotes the mobile node (or rather the receiving node), and
P indicates power and
G indicates gain.

The repeater amplification gain is based on at least the repeater to the receiver(s) channel gain, where the considered receiver or receivers may change over times, and when a group of receivers are targeted, the channel gain to the receiver with the 0 worst performance is considered.

As can be seen from Eq. 1, assuming that the desired MN receive-power $P_{MN}^{(RX)}$ is known, and the relay/repeater node receive-power $P_{RN}^{(RX)}$ is given, the required relay node gain depends (mainly) on the relay/repeater node to mobile node channel gain $G_{RN \to MN}$. The desired MN receive-power $P_{MN}^{(RX)}$ and the relay/repeater node receive-power $P_{RN}^{(RX)}$ are both given by the quality of service requirements, bit error rate, data rate, and noise plus interference situation.

The relay node gain $G_{RN}$ should be compared to the threshold. The switching between the modes in this embodiment can be described through $$\text{if } G_{RN} < G_0, \text{ then Mode 1}$$

$$\text{elseif } G_{RN} \geq G_0, \text{ then Mode 2} \quad (2)$$

As mentioned above, in the preferred embodiment the second mode can utilize different resources in terms of time, frequency or coding. In an alternative embodiment, both the first and the second mode involve using different resources for transmitting and receiving. In this case, the first mode may be, for example, using different codes for transmitting and receiving, while the second mode may be using different frequencies, or separating the received and transmitted signals in time.

More than one threshold may be used, to enable selection between several different modes. In this case, the first mode may still be using the same resource for transmitting and receiving and two or three additional modes may be defined in which receiving and transmitting use different resources. Alternatively all modes may use different resources. For example, the first mode may be using different orthogonal spreading codes, the second mode using different frequencies and the third mode separating the signals in time. The selection between several different modes may be performed in one step, or in several steps. In the former case, each mode is assigned to an interval of amplifier gain values and the mode matching the actual amplifier gain is selected. In the latter case, assuming a first mode is used, a switch to the second mode is performed when the amplifier gain passes a first threshold and a switch to the third mode is performed when the amplifier gain passes a second threshold.

In order to determine which mode to operate in, by calculating the gain or the relay/repeater node, at least the gain between the relay/repeater node to the receiving node must be determined. This can be done in several different ways. For example the link gain may be measured proactively and reported to the mode selector, which, as stated above may be located in the sender, the receiver or the relay/repeater node, or may be distributed between them. Alternatively, a reactive type of operation may be used.

In one possible reactive embodiment of the invention, a connection is always initially set up in the second mode, that is, in the mode where the relay/repeater receives and sends on different resources. In this starting phase, the channel and gains are measured and if suitable, the relay/repeater node is switched to operate in the first mode.

Figure 5:
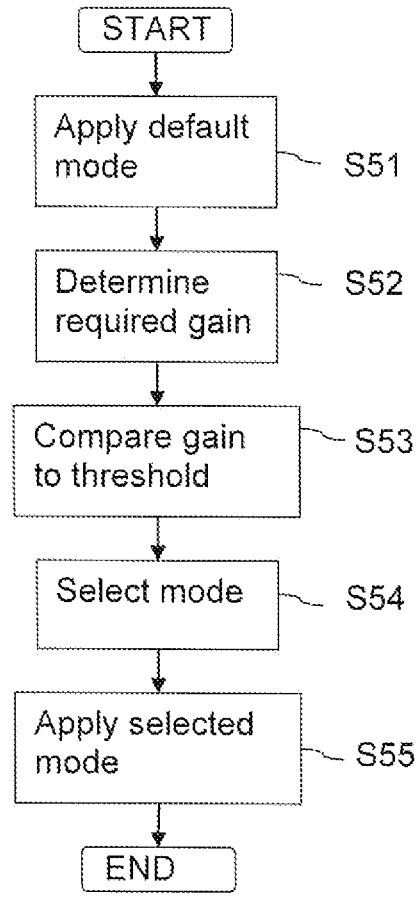
FIG. 5 is a flow chart of a method according to the invention.

FIG. 5 is an example of a reactive embodiment of the method as discussed above.

In step S51 a default mode of operation is applied when amplifying and forwarding signals. This default mode is preferably the second mode.

In step S52 a required amplifying gain is determined.

In step S53 the required amplifying gain is compared to a predetermined threshold.

In step S54 a mode of operation is selected in dependence of the result of the comparison performed in step S53. As discussed above, the selection may be performed in the repeater node itself, in the sender or transmitter, or distributed between two or more of these units.

In step S55 the selected mode of operation is applied to the repeater node.

In a proactive embodiment the procedure may instead start with measuring the link gain and using this to determine the required amplifying gain in step S52.

As will be understood, different relaying modes may be used simultaneously in the uplink and downlink communication through the same relay or repeater node.

Figure 6:
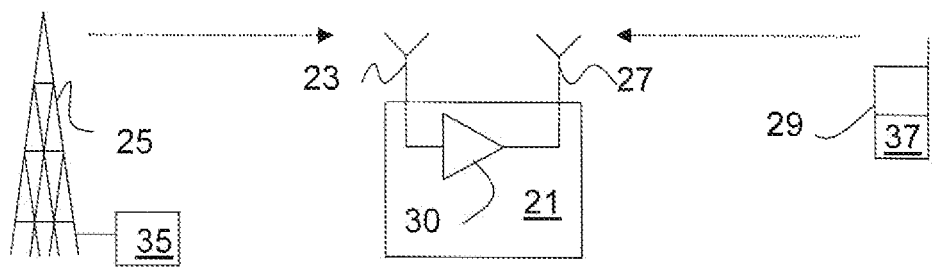
FIG. 6 illustrates the control message resulting from the mode switching function executed at least partially at the sender, the receiver or both nodes with which the repeater/relay node is in communication.

FIG. 6 illustrates a situation similar to that of FIG. 2, in which the base station 25 and/or the mobile terminal 29 comprise logic units 35, 37, respectively, arranged to determine the preferred mode of operation to be used by the relay node 21. As illustrated by the dashed arrows in FIG. 6, the base station 25, the mobile terminal 29, or both, may send a message, conveying information, to the repeater/relay node 21 regarding operation mode. The message may be an order that has to be followed or a recommendation that the relay/repeater node 21 based on further information housed or collated by the repeater/relay that account for when deciding which mode to operate in. In the latter case, the node 21 may base its decision on information received from either the base station 25, the mobile terminal 29, or both.

While the description above has been based on downlink communication, that is, communication from the base station 25 to the mobile terminal 29, the skilled person will readily understand that the structure and function of the inventive repeater node will be completely analogous to that described above regardless of the nature of the sending and transmitting node. That is, the teachings of this document could be applied to uplink or downlink communication, as well as to communication between any two units involving the use of a repeater and/or relay node between the units. Therefore, the scope of the claims should not be limited to communication in any particular direction, or between any particular type of communicating units.

The invention claimed is:

1. A node for use in a wireless communications system, said node comprising:
    a receive antenna side having at least one receive antenna for receiving a signal through a wireless connection;
    an amplifier for amplifying the signal and a transmit antenna side having at least one transmit antenna for forwarding the amplified signal; and
    a mode switching unit for switching between at least a first forwarding mode and a second forwarding mode of operation of the node in dependence of an amplification gain requirement, wherein said forwarding mode determines a way of utilizing resources by the transmit antenna side and the receive antenna side.

2. A node according to claim 1 wherein the mode switching unit is arranged to switch between the first forwarding mode wherein the transmit antenna side utilizes the same resource as the receive antenna side and the second forwarding mode wherein the transmit antenna side utilizes a different resource from the receive antenna side.

3. A node according to claim 2, wherein the transmit antenna side in the second forwarding mode utilizes a resource that is substantially orthogonal to the resource used by the receive antenna side.

4. A node according to claim 1, wherein the mode switching unit is arranged to switch between the first forwarding mode wherein the transmit antenna side utilizes a different resource from the receive antenna side and the second forwarding mode wherein the transmit antenna side utilizes a different resource from the receive antenna side, said first and second forwarding modes enabling different ways of changing the resource.

5. A node according to claim 1, wherein the mode switching unit is arranged to switch to the first forwarding mode when the required amplification gain is below a first threshold.

6. A node according to claim 5, wherein the mode switching unit is arranged to switch to the second forwarding mode when the required amplification gain is above the first threshold.

7. A node according to claim 5, wherein the mode switching unit is arranged to switch to a third forwarding mode when the required amplification gain is above a second threshold which is higher than the first threshold.

8. A node according to claim 1, further comprising a mode selector unit for selecting a forwarding mode and for feeding information about the selected forwarding mode to the mode switching unit.

9. A node according to claim 1, wherein the mode switching unit is arranged to receive from a sending node and/or a receiving node a message about a preferred forwarding mode.

10. A method of repeating a signal in a cellular network, said method comprising
    receiving the signal in a node comprising a receive antenna side having at least one receive antenna, a transmit antenna side having at least one transmit antenna, and an amplifier between said receive antenna side and said transmit antenna side,
    amplifying the signal
    transmitting the amplified signal; and
    selecting one of a first forwarding mode and a second forwarding mode of operation for the node in dependence of an amplification gain requirement, wherein said forwarding mode determines a way of utilizing resources by the transmit antenna side and the receive antenna side.

11. A method according to claim 10, wherein selecting the forwarding mode comprises selecting between the first forwarding mode wherein the signal is received and transmitted using the same resource and the second forwarding mode wherein the signal is transmitted on a different resource from that on which it was received.

12. A method according to claim 10, wherein the second forwarding mode involves transmitting the amplified signal on a resource that is substantially orthogonal to the resource used by the receive antenna side.

13. A method according to claim 10, wherein selecting the forwarding mode comprises switching between the first forwarding mode wherein the transmit antenna side utilizes a different resource from the receive antenna side and the second forwarding mode wherein the transmit antenna side utilizes a different resource from the receive antenna side, said first and second forwarding modes enabling different ways of varying the resource.

14. A method according to claim 10, wherein the first forwarding mode is selected when the required amplification gain is below a first threshold.

15. A method according to claim 14, wherein the second forwarding mode is selected when the required amplification gain is above the first threshold.

16. A method according to claim 14, further comprising selecting a third forwarding mode when the required amplification gain is above a second threshold which is higher than the first threshold.

17. A method according to claim 10, wherein selecting the forwarding mode is performed in the node.

18. A method according to claim 10, wherein selecting the forwarding mode comprises identifying a preferred forwarding mode in a sending node and/or a receiving node and communicating information about the preferred forwarding mode from the sending and/or receiving node to the repeater node.

19. A wireless communications system comprising:
    at least one base station arranged to communicate with at least one mobile terminal; and
    at least one forwarding node, said forwarding node comprising a receive antenna for receiving a signal from the base station through a wireless connection, an amplifier for amplifying the signal, and a transmit antenna for forwarding the amplified signal, said forwarding node configured to select one of a first forwarding mode and a second forwarding mode of operation in dependence on an amplification gain requirement, wherein said forwarding mode determines a way of utilizing resources by the transmit antenna side and the receive antenna side.

* * * * *